United States Patent [19]
Hanna

[11] 3,934,297
[45] Jan. 27, 1976

[54] OVERHEAD CAR WASHES
[76] Inventor: Daniel C. Hanna, 1133 SW. Rivington Drive, Portland, Oreg. 97201
[22] Filed: June 14, 1974
[21] Appl. No.: 479,230

[52] U.S. Cl............................. 15/53 AB; 15/DIG. 2
[51] Int. Cl.²........................................... B60S 3/06
[58] Field of Search .... 15/DIG.2, 21 D, 21 E, 21 B, 15/21 C, 53, 97 R, 302; 52/86–88, 639–644

[56] References Cited
UNITED STATES PATENTS
| 2,652,599 | 9/1953 | Rodda et al. | 52/644 |
| 2,666,507 | 1/1954 | Ruark | 52/644 X |
| 3,624,852 | 12/1971 | Hanna | 15/21 D |
| 3,764,383 | 10/1973 | McBurnett | 15/DIG. 2 |
| 3,793,663 | 2/1974 | Lieffring | 15/21 D |

FOREIGN PATENTS OR APPLICATIONS
| 6,706,366 | 11/1967 | Netherlands | 15/DIG. 2 |

Primary Examiner—Edward L. Roberts
Attorney, Agent, or Firm—Klarquist, Sparkman, Campbell, Leigh, Hall & Whinston

[57] ABSTRACT

Overhead frameworks suspending cleaning mechanisms into the paths of cars are supported by pairs of side arches connected rigidly thereto and forming portions of frameworks therewith. In a specific embodiment, the framework is made up of modules, and in another truss-like cross frames suspending cleaning mechanisms are secured to side arches.

12 Claims, 16 Drawing Figures

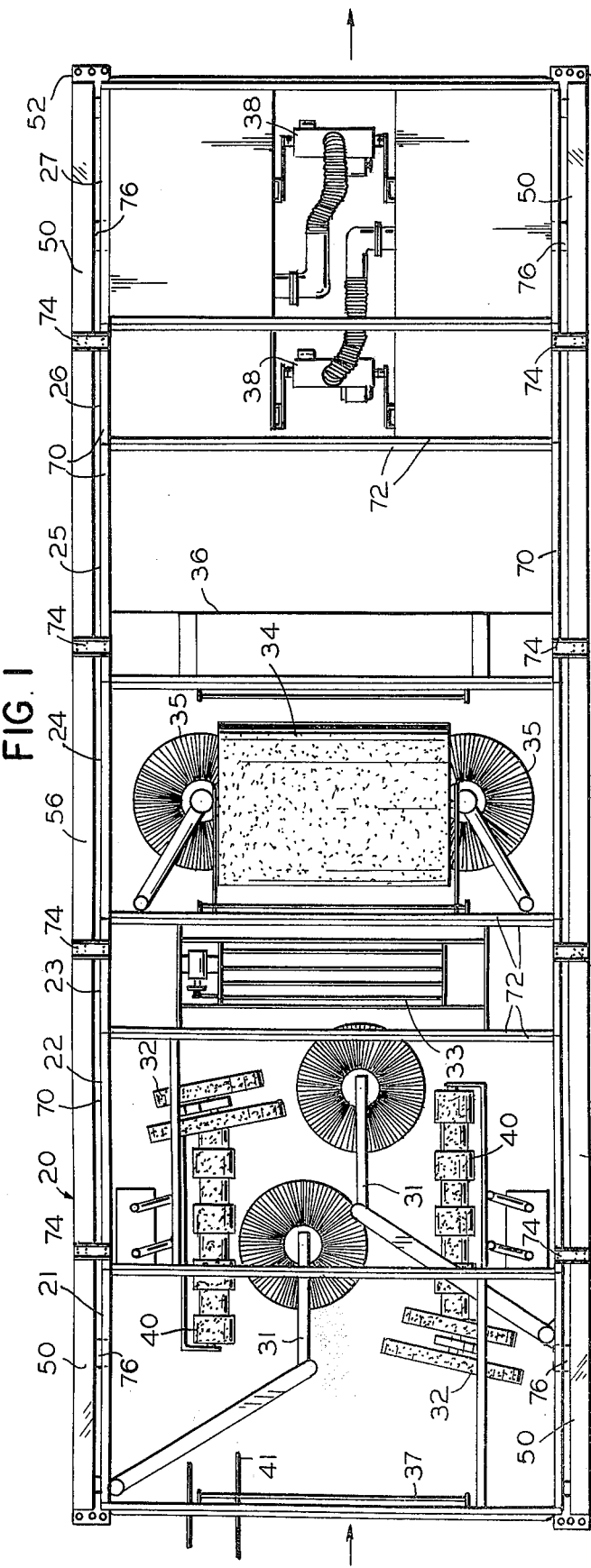
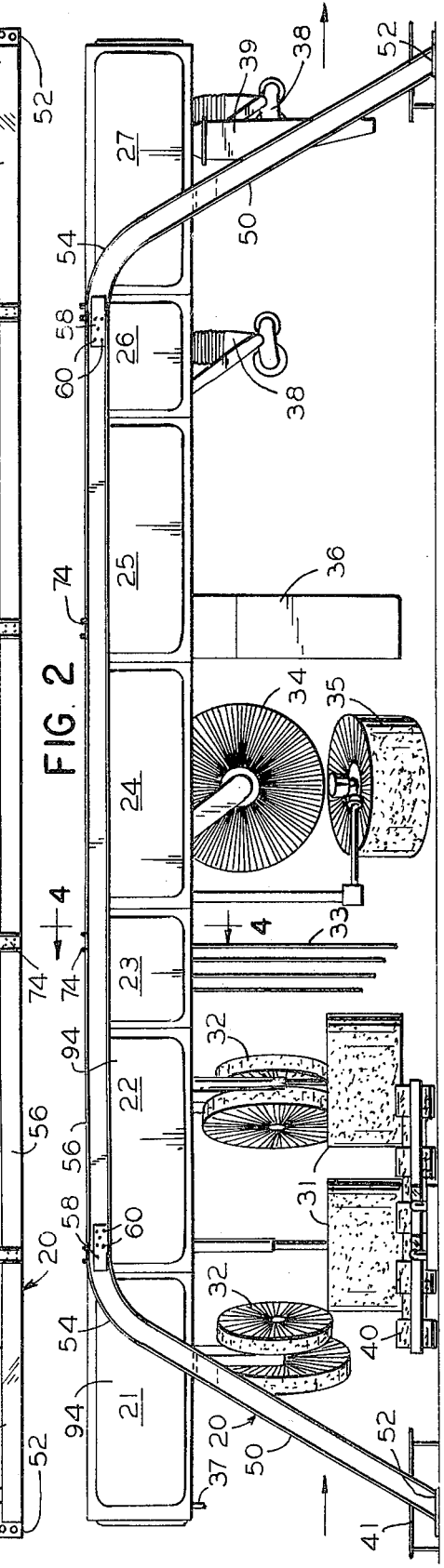

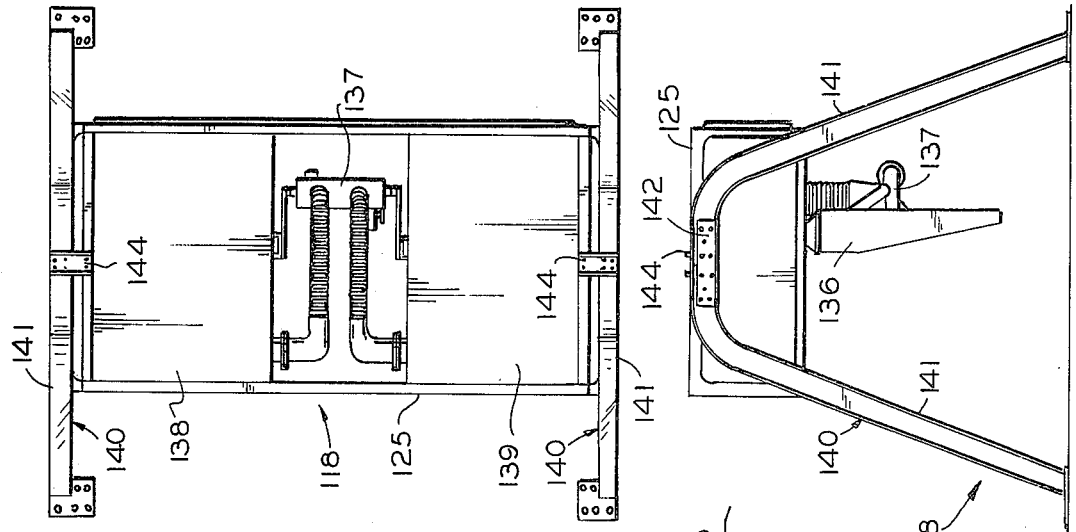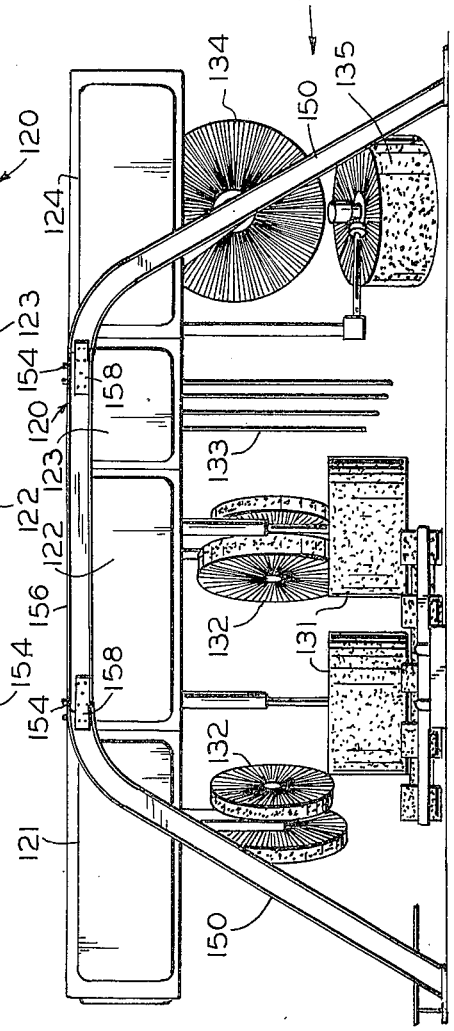
FIG. 7
FIG. 8

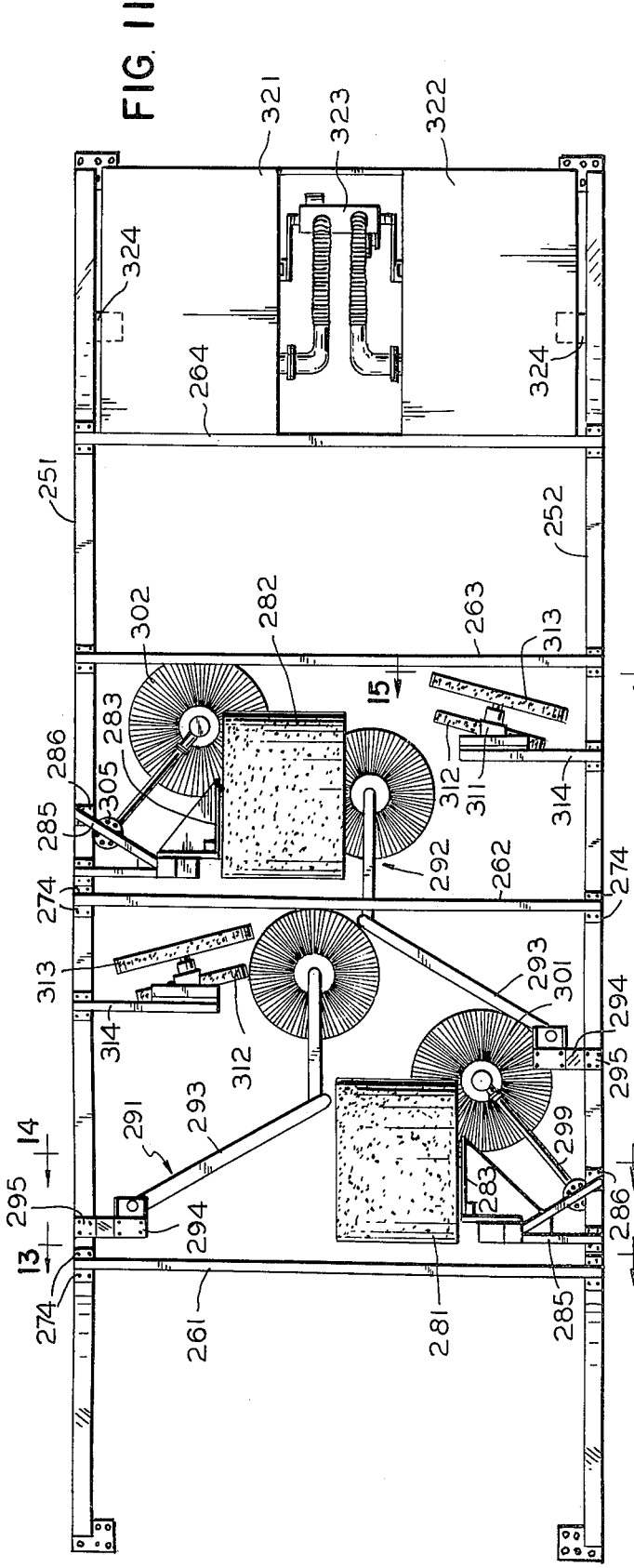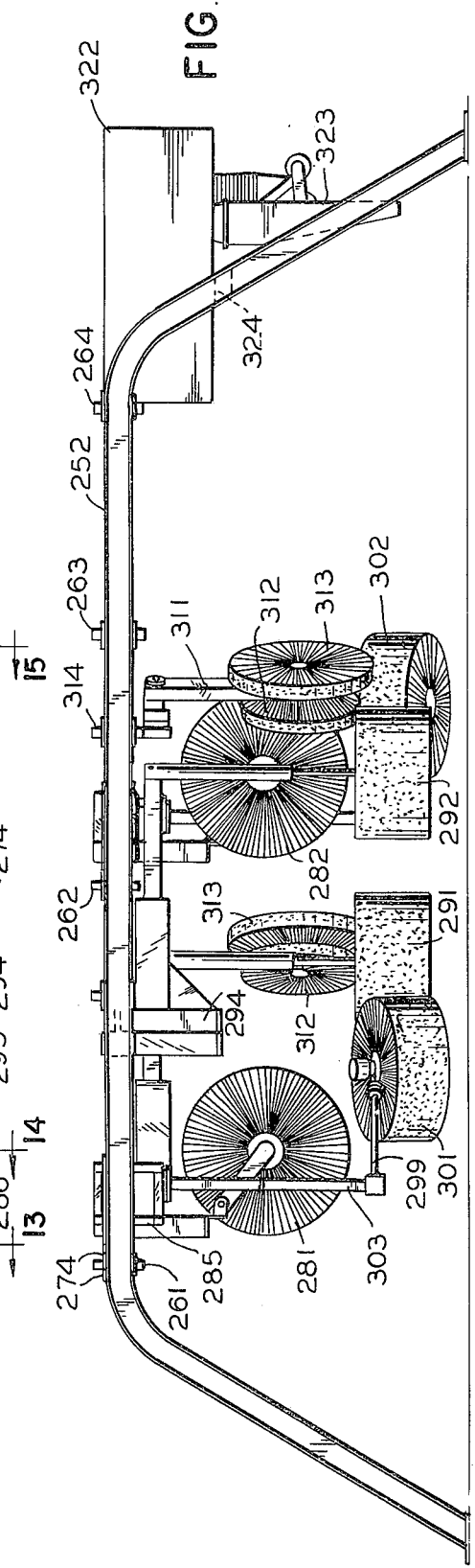

OVERHEAD CAR WASHES

DESCRIPTION

This invention relates to overhead car washes, and has for an object thereof the provision of new and improved overhead car washes.

Another object of the invention is to provide an overhead car wash wherein side arches and an overhead framework form the frame of the car wash.

A further object of the invention is to provide an overhead module car wash wherein an overhead modular structure is suspended from a plurality of longitudinal beams.

Another object of the invention is to provide an overhead module car wash including a plurality of overhead modules connected to and supported by a plurality of pairs of arches.

Another object of the invention is to provide an overhead car wash wherein truss-like crossbeams and side arches form the framework from which brushing mechanisms are suspended.

In the drawings:

FIG. 1 is a partially schematic, top plan view of an improved overhead car wash forming one embodiment of the invention;

FIG. 2 is a side elevation view of the car wash of FIG. 1;

FIG. 7 is a partially schematic, top plan view of an improved overhead car wash forming an alternate embodiment of the invention;

FIG. 8 is a side elevation view of the car wash of FIG. 7;

FIG. 11 is a top plan view of an improved overhead car wash forming an alternate embodiment of the invention;

FIG. 12 is a side elevation view of the car wash of FIG. 11;

Figure 3:
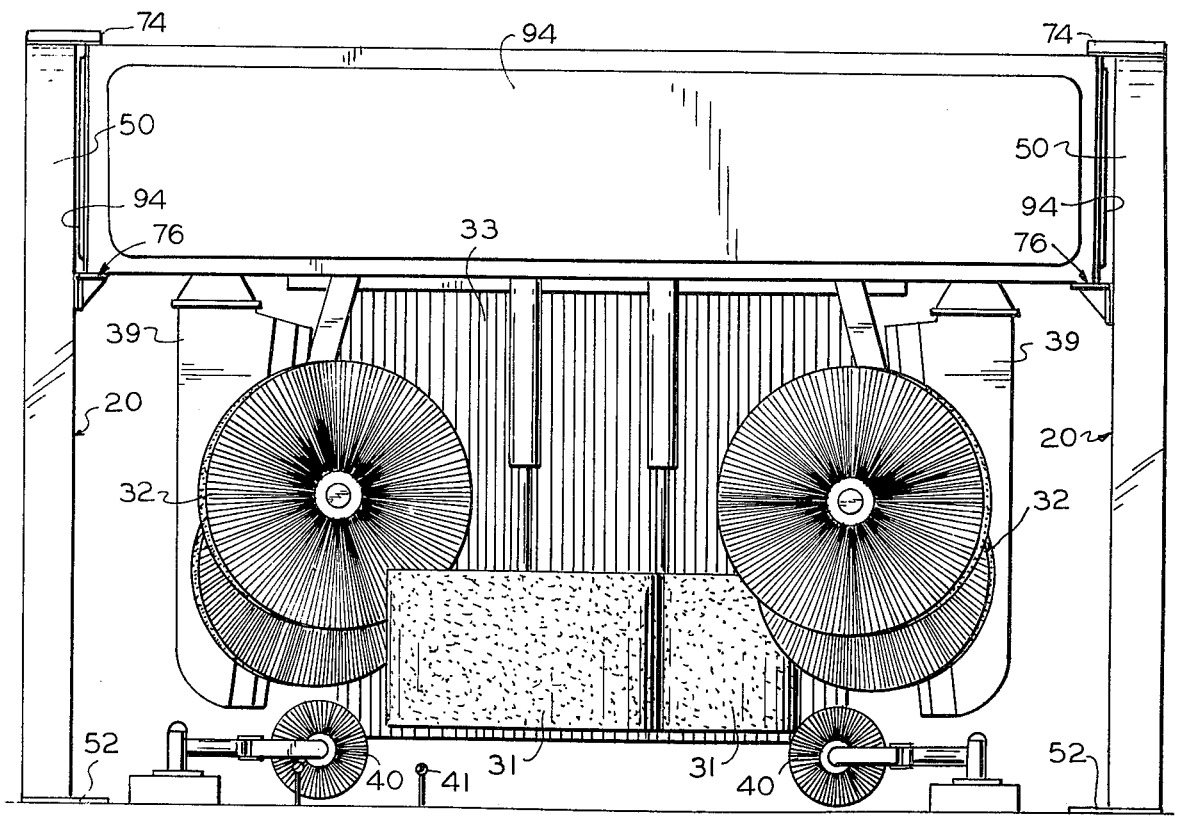
FIG. 3 is a vertical sectional view taken along line 3—3 of FIG. 2.
Figure 4:
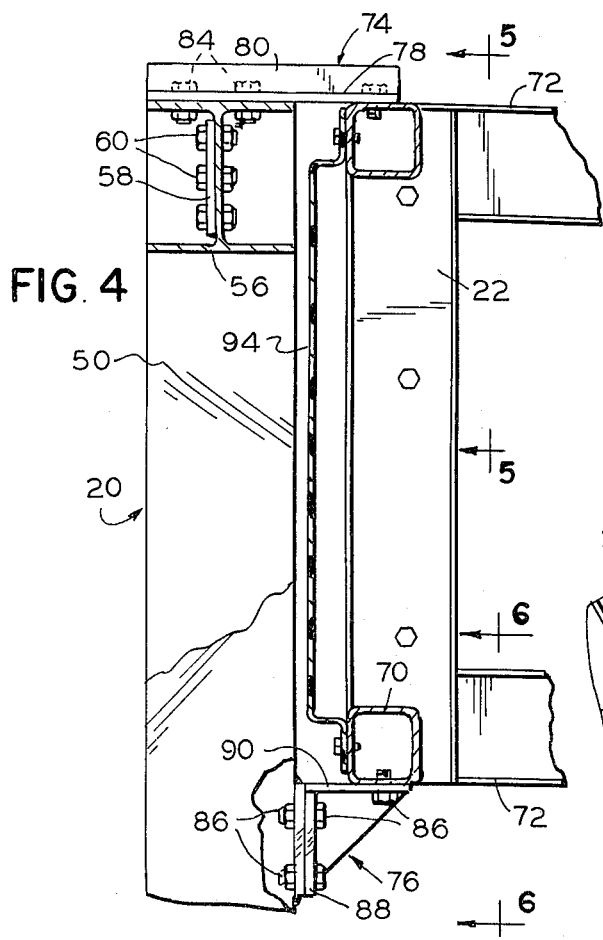
FIG. 4 is an enlarged, fragmentary, vertical sectional view taken along line 4—4 of FIG. 2.
Figure 5:
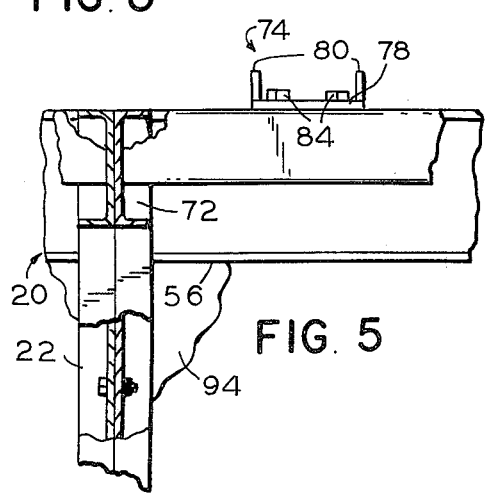
FIG. 5 is an enlarged, fragmentary, vertical sectional view taken along line 5—5 of FIG. 4.
Figure 6:
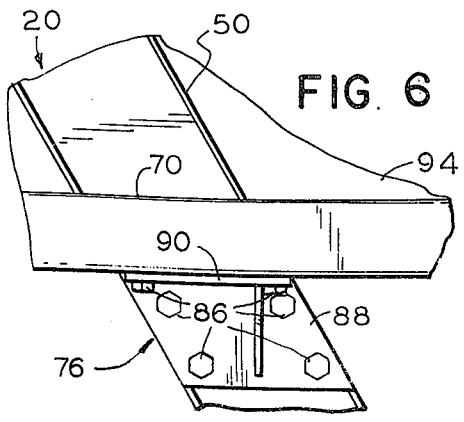
FIG. 6 is an enlarged, fragmentary, vertical sectional view taken along line 6—6 of FIG. 4.
Figure 9:
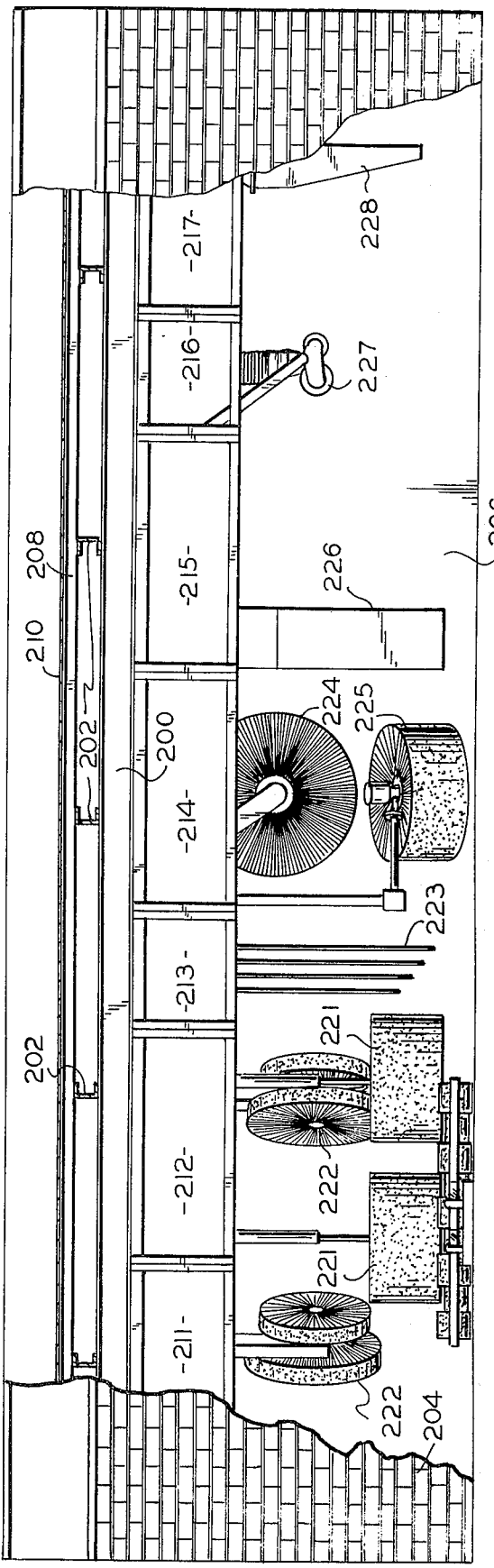
FIG. 9 is a fragmentary side elevation view of an improved overhead car wash forming an alternate embodiment of the invention.
Figure 10:
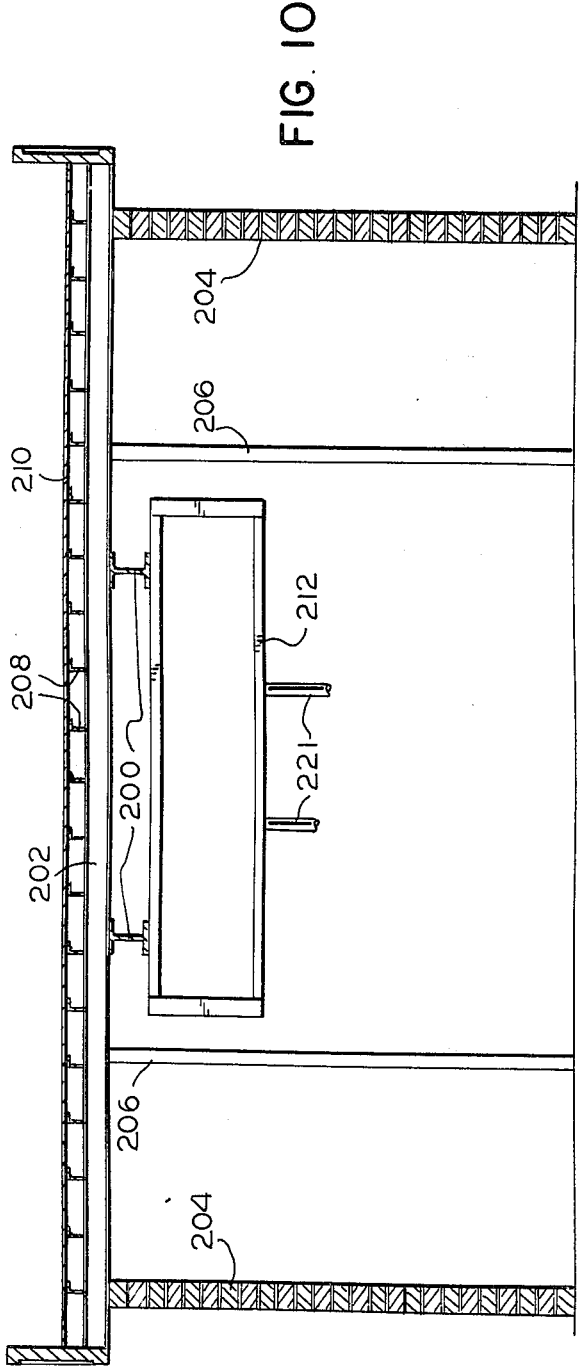
FIG. 10 is a front elevation view of the car wash of FIG. 9.

Referring now in detail to the drawings, there is shown in FIGS. 1-6 a car wash forming one specific embodiment of the invention and including a pair of side arches 20 supporting and forming a unitary framework with module frames 21-27 which suspend cleaning mechanisms and operating mechanisms therefrom, the cleaning mechanisms including wraparound brushes 31, window brushes 32, a friction wash 33, a top brush 34, rocker panel brushes 35, a waxer 36, soaper sprays 37 and drying blowers 38 and 39. Only wheel cleaning brushes 40 are mounted on the floor, all the other cleaning mechanisms being overhead suspended, except a car guide 41 and a conveyor (not shown) being on the floor.

Each arch 20 includes I-beam legs 50 supported by foot plates 52 bolted to the floor and having upper curved portions 54. An upper horizontal beam 56 is secured to the legs in abutment with the upper ends of the legs by splicing plates 58 welded to the webs of the legs and bolted to the web of the beam 56 by bolts 60.

Each module frame 21-27 is a skeletal box of channels and including box-like ends 70 bolted together, and crossbeams 72. The module frames are rigidly secured to the arches by upper module hangers 74 and lower module support brackets 76. Each hanger includes a base 78, and vertical side members 80. Bolts 84 secure the hangers rigidly to the tops of the beams 56 and to the tops of the ends 70. The brackets 76 are welded rigidly to the legs 50 and are secured to the bottoms of the ends 70 by bolts 86. The brackets include vertical parallelogram plates 88 welded to the legs, horizontal support plates 90 and braces 92. Cupped siding panels 94 are secured to the ends 70 to enclose the ends of the module frames.

EMBODIMENT OF FIGS. 7 AND 8

A car wash forming an alternate embodiment of the invention includes a long multiple module unit 116 and a short multiple module unit 118, the unit 116 including parallel side arches 120 supporting modules 121, 122, 123 and 124, and the unit 118 including a blower module 125. The modules 121-125 are similar to the modules 21-27 (FIG. 1) and the modules 121-124 support brush mechanisms 131, 132, 133, 134 and 135, and the module 125 supports blower mechanisms 136 and 137 and air supply or blower units 138 and 139. Arches 140, like the arches 120 but shorter, form a rigid framework with the module 125, legs 141 like the legs 50 being secured together by splicing plates 142, and hangers 144 like the hangers 74, and brackets (not shown) like the brackets 76 secure the module 125 rigidly to the legs. Similarly, the arches 120 include legs 150 like the legs 50 and top beams 156 like the beams 56, splicing plates 158 securing the legs 150 rigidly to the top beams 156, and hangers 154 like the hangers 74, and brackets (not shown) like the brackets 76 rigidly connecting the skeletal frame modules 121-124 to the beams 156 and legs 150.

EMBODIMENT OF FIGS. 9 AND 10

An improved overhead module car wash forming an alternate embodiment of the invention includes a pair of longitudinal I-beams 200 supported directly over a path of cars to be washed. The I-beams are secured rigidly to channel crossbeams 202 supported on walls 204 and 206. The crossbeams 202 support rafters 208 to which a roof 210 is secured. Modules 211-217 are secured to the I-beams and support brushing and cleaning mechanisms 221, 222, 223, 224, 225, 226, 227 and 228. The modules 211-217 are like the modules 21-27.

EMBODIMENT OF FIGS. 11-16

Figure 13:
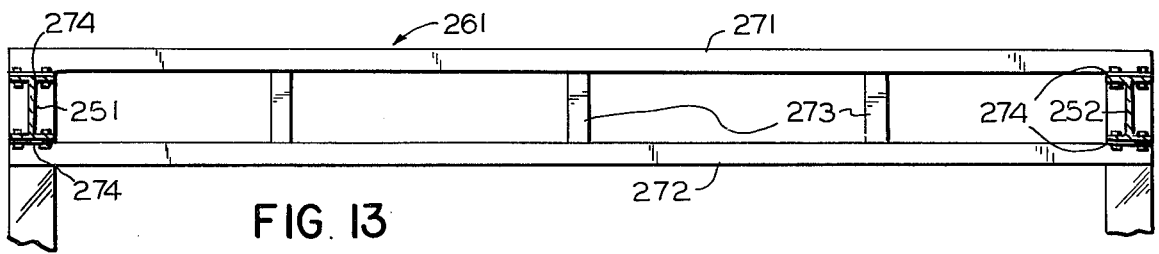
FIG. 13 is an enlarged, fragmentary, vertical sectional view taken along line 13—13 of FIG. 11.
Figure 14:
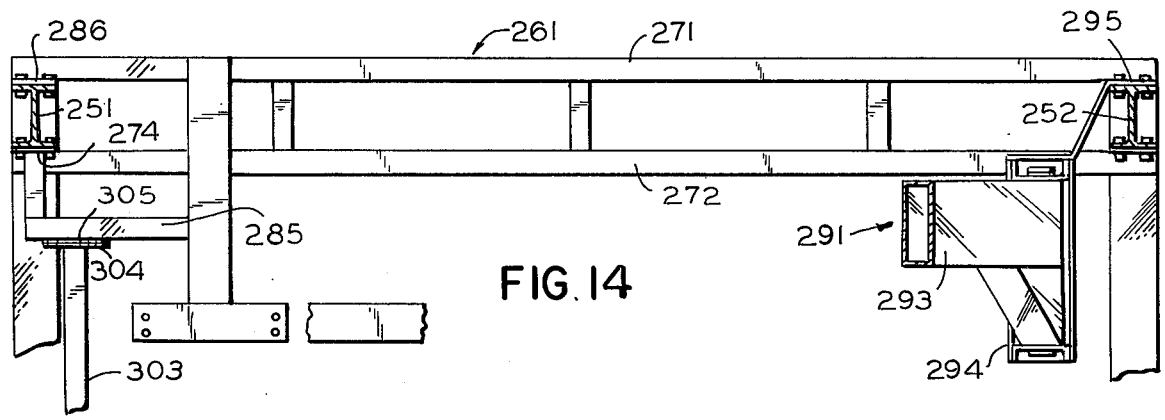
FIG. 14 is an enlarged, fragmentary, vertical sectional view taken along line 14—14 of FIG. 11.
Figure 15:
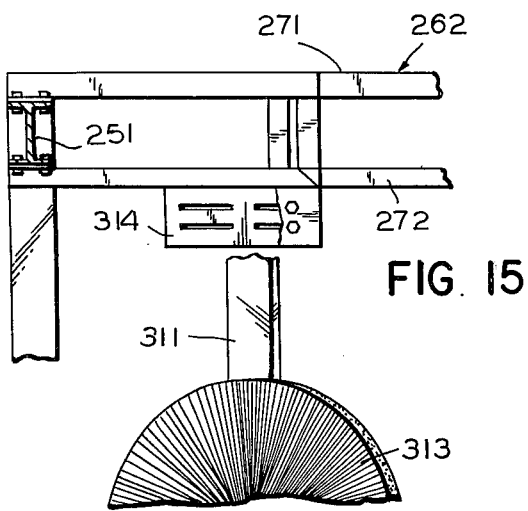
FIG. 15 is an enlarged, fragmentary, vertical sectional view taken along line 15—15 of FIG. 11; and, FIG. 16 is a skeletal, perspective view of the car wash of FIG. 11.
Figure 16:
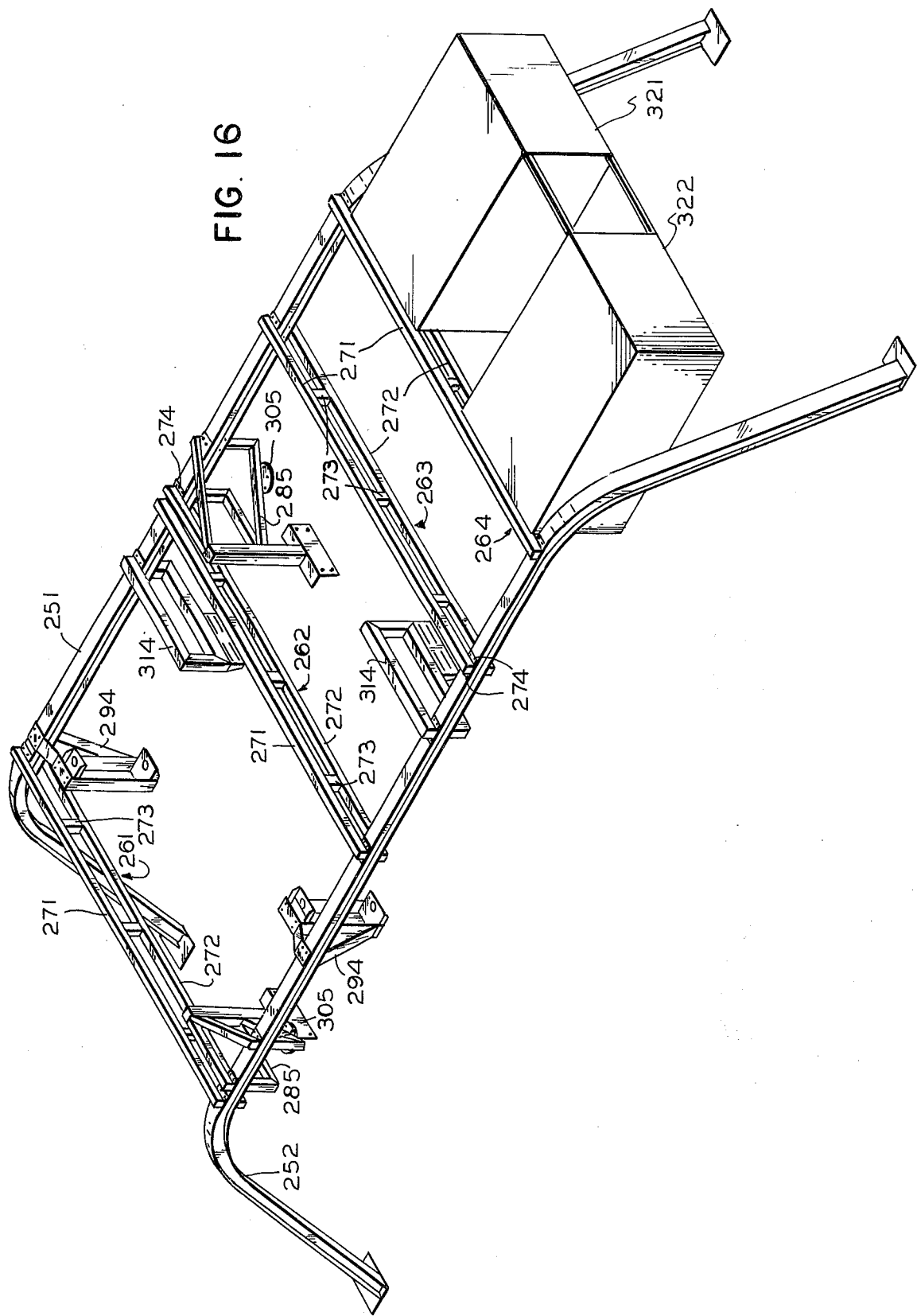

An overhead car wash forming an alternate embodiment of the invention shown in FIGS. 11-16 is generally similar to the car wash of FIGS. 1-6. The car wash of FIGS. 11-16 comprises I-beam, side arches 251 and 252, and cross frames 261, 262, 263 and 264 bolted to the side arches. That is, the framework of the car wash of FIGS. 11–16 is not of box-like modular construction, but instead comprises the two rigid side arches which are joined rigidly together by the cross frames.

Each of the cross frames is of truss-like construction and includes a tubular upper chord 271, a tubular lower chord 272 and tubular webs 273 welded to the chords. Brackets 274 welded to the chords are bolted to the top and bottom flanges of the I-beam arches to rigidly secure the cross frames to the arches.

Split top brushes 281 and 282 are mounted on arms 283 pivotally supported by posts 284 carried by V-shaped frames 285 secured to the side frames by brackets 286 bolted thereto. Wraparound brushes 291 and 292 have primary arms 293 pivotally mounted on clevises 294 having forked bracket portions 295 bolted to the arches. Rocker panel brushes 301 and 302 are mounted by arms 299 pivotally on vertical posts 303 mounted by pipe flanges 304 bolted to pipe flanges 305 welded to the frames 285. Arms 311 (FIG. 15) pivotally mount pairs of window brushes 312 and 313 on forked mounting frames 314 bolted to top and bottom flanges of the arches 251 and 252. Blower housings 321 and 322 (FIGS. 11 and 12) supplying drying air to nozzles 323 are mounted on the cross frame 264 and brackets 324 secured to legs of the arches 251 and 252.

What is claimed is:

1. In an improved overhead car wash,
a pair of side arches,
an overhead framework rigidly joining the side arches, said framework comprising a plurality of modules comprising box-like frames secured together and to the side arches,
and brushing and cleaning mechanisms supported by the overhead framework, each of said modules supporting at least one of said brushing and cleaning mechanisms, said box-like frames and said side arches providing a unified integrated structure both for supporting said mechanisms and for providing a structure to house the same.

2. The improved overhead car wash of claim 1 wherein said box-like frames comprise a pair of rigid side frames secured to the upper portions of the side arches and crossbeam means rigidly joining said side frames.

3. The improved overhead car wash of claim 1 wherein the side arches comprise I-beams.

4. The improved overhead car wash of claim 1 wherein the side arches comprise continuous I-beams.

5. The improved overhead car wash of claim 4 wherein each I-beam includes a pair of legs having arcuate upper end portions and a top beam joined to the upper ends of the legs.

6. In an improved overhead car wash,
a pair of parallel overhead beam means,
support means supporting the beams in overhead position,
an elongated overhead framework secured to and supported by the beams, said framework comprising a plurality of modules, each of said modules comprising a pair of rigid side frames and bridge means rigidly connected to and extending between said side frames, said side frames and said bridge means defining a box-like structure,
said modules, said overhead beam means and said support means therefor being connected to provide a unified integrated structure,
and a plurality of brushing and cleaning mechanisms supported by said modules and housed thereunder each of said modules supporting at least one of said brushing and cleaning mechanisms.

7. The improved overhead car wash of claim 6 wherein the beam means and the support means comprises a pair of side arches having legs and top beams.

8. The overhead car wash of claim 7 wherein the rigid side frames comprise parallel tubular elements and panels joining the same.

9. The overhead car wash of claim 7 including support plates connecting the side frames rigidly to the top beams.

10. The overhead car wash of claim 7 including brackets secured to the legs and on which the side frames rest.

11. The overhead car wash of claim 7 wherein the legs and top beams are I-shaped in transverse cross-section.

12. The overhead car wash of claim 11 wherein the upper end portions of the legs are curved and including splice plates securing the legs and top beams together.

* * * * *